United States Patent [19]
Maurer et al.

[11] Patent Number: 5,682,212
[45] Date of Patent: Oct. 28, 1997

[54] OPTICAL ELEMENTS HAVING IMAGE-FORMING, COLOR- AND POLARIZATION-SELECTIVE REFLECTION AND CONTAINING CHOLESTERIC LIQUID CRYSTALS, AND THE PREPARATION AND USE OF THESE ELEMENTS

[75] Inventors: Robert Maurer; Stefan Beiergroesslein, both of München; Franz-Heinrich Kreuzer, Martinsried, all of Germany

[73] Assignee: Consortium für elektrochemische Industrie GmbH, Germany

[21] Appl. No.: 293,262

[22] Filed: Aug. 22, 1994

[30] Foreign Application Priority Data

Aug. 26, 1993 [DE] Germany ............ 43 28 785.9

[51] Int. Cl.⁶ ............ G02F 1/1335; G02F 1/1333; G02F 1/13
[52] U.S. Cl. ............ 349/5; 349/8; 349/160; 349/176; 349/200
[58] Field of Search ............ 359/63, 64, 65, 359/82, 37, 53, 77, 105, 40, 41; 349/5, 8, 160, 176, 200

[56] References Cited

U.S. PATENT DOCUMENTS

| | | | |
|---|---|---|---|
| 3,679,290 | 7/1972 | Adams et al. | 359/37 |
| 3,891,307 | 6/1975 | Tsukamoto et al. | 359/55 |
| 3,947,183 | 3/1976 | Haas et al. | 359/84 |
| 3,971,931 | 7/1976 | Jehle | 359/41 |
| 4,048,358 | 9/1977 | Shanks | 359/64 |
| 4,097,121 | 6/1978 | Tauer | 359/54 |
| 4,354,740 | 10/1982 | Cole, Jr. | 359/77 |
| 4,388,453 | 6/1983 | Finkelmann et al. | 528/15 |
| 4,679,911 | 7/1987 | Jacobs et al. | 359/40 |
| 4,780,383 | 10/1988 | Garrett et al. | 430/11 |
| 4,795,248 | 1/1989 | Okada et al. | 359/53 |
| 5,082,354 | 1/1992 | Kalmanash | 359/70 |
| 5,211,877 | 5/1993 | Andrejewski et al. | 252/299.01 |
| 5,235,443 | 8/1993 | Barnik et al. | 359/37 |
| 5,260,815 | 11/1993 | Takizawa | 359/41 |
| 5,295,009 | 3/1994 | Barnik et al. | 359/65 |
| 5,309,265 | 5/1994 | Buchecker et al. | 359/102 |
| 5,319,478 | 6/1994 | Fünfschilling et al. | 359/53 |
| 5,371,617 | 12/1994 | Mitsutake et al. | 359/41 |
| 5,387,953 | 2/1995 | Minoura et al. | 359/495 |

FOREIGN PATENT DOCUMENTS

| | | |
|---|---|---|
| 0066137 | 12/1982 | European Pat. Off. . |
| 0302619 | 2/1989 | European Pat. Off. . |
| 0348141 | 12/1989 | European Pat. Off. . |
| 0358208 | 3/1990 | European Pat. Off. . |
| 0407830 | 1/1991 | European Pat. Off. . |
| 3604757 | 12/1987 | Germany . |
| 61-177431 | 8/1986 | Japan ............ 359/82 |

OTHER PUBLICATIONS

14th Int. Liquid Conf., Abstracts II, 921(1992), "Densely Crosslinked Cholesteric Polymer Networks", by D.J. Broer et al.

Japanese Journal of Applied Physics, 29, No. 10 1990, 1974–1984 "New Liquid Crystal Polarized Color Projection Principle" by Schadt et al.

Patent Abstracts of Japan vol. 13, No. 499 (P–957), Nov. 10, 1989 & JP–A–01 200 325 (Emiko Morimoto), Aug. 11, 1989.

*Primary Examiner*—William L. Sikes
*Assistant Examiner*—Walter Malinowski

[57] ABSTRACT

The invention relates to optical elements having image-forming, color- and polarization-selective reflection and containing cholesteric liquid crystals, and to the preparation and use of these elements. In the wavelength- and polarization-selective elements which form an optical image, at least one cholesteric liquid crystal is enclosed in the cavity of constant thickness between two light-transmitting substrates having curved surfaces in such a way that the helix axis of the liquid crystal is aligned perpendicular to the curved surface of the light-transmitting substrates. The elements are suitable for use as beam splitters or recombiners in projection displays.

7 Claims, 5 Drawing Sheets

OPTICAL ELEMENTS HAVING IMAGE-FORMING, COLOR- AND POLARIZATION-SELECTIVE REFLECTION AND CONTAINING CHOLESTERIC LIQUID CRYSTALS, AND THE PREPARATION AND USE OF THESE ELEMENTS

FIELD OF INVENTION

The present invention relates to optical elements having image-forming, color- and polarization-selective reflection and containing cholesteric liquid crystals, and to the preparation and use of these elements.

BACKGROUND OF INVENTION

Cholesteric liquid crystals (CLCs) reflect circular-polarized light in a wavelength range which is dependent on the helical structure of the CLC. The reflection color is determined by the pitch (p) of the helical structure and is described by the central wavelength $\lambda_{max}$ of the reflection band of band width $\Delta\lambda$. The central wavelength of the reflection band is referred to below as the reflection wavelength. The reflection wavelength is dependent on the viewing angle. It obeys the following equation:

$$\lambda_{max} = n*p*\cos\psi \tag{1},$$

where n is the mean refractive index of the CLC, and $\psi$ is the angle between the incident ray and the perpendicular. Thus, $\psi=0°$ for perpendicular incidence of light.

The characteristic reflection properties of CLCs appear in the direction of the helix axis or at a slight deviation from this direction. The circular polarization of the reflected light in the case of perpendicular incidence decreases with increasing angle of incidence. The circular polarization of the reflected light can thus only be utilized for small angles of incidence.

The use of cholesteric liquid crystals as optical transmission filters is disclosed in U.S. Pat. No. 3,679,290. In addition to the various possibilities for adjusting the wavelength and the polarization of the reflected light, combinations of CLC layers are described which act as notch and band filters. The CLC layers are arranged in a planar manner.

U.S. Pat. No. 4,679,911 discloses that CLCs can be enclosed between a curved surface and a planar surface, so that the thickness of the CLC layer is not constant, but varies in a defined manner. In areas of infinitesimal thickness, all the incident light is transmitted, while in areas of finite layer thickness, the light is reflected if the reflection wavelength of the cholesteric liquid crystal and the wavelength of the incident light correspond. The described arrangement for ray profile customization uses curved surfaces in order to restrict the CLC volume. Owing to different radii of curvature, the enclosed volume varies in layer thickness, causing the desired location-dependent transmission.

EP-A-302 619 uses a planar filter of CLC to reflect a particular region of visible light to give circular polarization. The reflector described only changes the direction of propagation of the light; however, it does not have an image-forming function in the sense of a lens. In addition, the described circular polarization of the reflected light is incomplete owing to the large angle of incidence.

EP-A-348 141 discloses an infrared filter whose cut-off sharpness is improved by using a CLC. The curved cholesteric layer, shown in FIG. 2b, in the protective goggles lens shown reflects light of an undesired Wavelength in any desired direction without forming an image and thus filters the transmitted light.

Schadt et al., in Japanese Journal of Applied Physics, 29, No. 10, 1990, 1974–1984, describe an arrangement of planar CLC reflectors for color and polarization selection for a projection display. The reflection at the CLC layer in each case takes place at an angle of 45°. Since the circular polarization of the reflected light decreases with increasing angle of incidence, the light reflected by these polarizers has virtually no polarization.

SUMMARY OF THE INVENTION

The present invention relates to wavelength- and polarization-selective elements which form an optical image, wherein at least one cholesteric liquid crystal is enclosed in the cavity of constant thickness between two curved surfaces of light-transmitting substrates in such a way that the helix axis of the liquid crystal is aligned perpendicular to the curved surface of the light-transmitting substrates.

For the purposes of the present invention, cholesteric liquid crystals (CLCs) are taken to mean substances which have a helical phase whose optical properties correspond to those of a nematic chiral phase.

The invention furthermore relates to the production of the wavelength- and polarization-selective reflectors which form an optical image.

The invention also relates to the use of these reflectors as beam splitters or recombiners, for example in high-light-flux equipment, such as in a projection display.

The novel reflectors reflect light color- and polarization-selectively depending on the CLC used. In addition, they act as an optical element which forms an image in the sense of a lens. Non-reflected light continues its path through the CLC layer without change. This thus gives rise to an image-forming reflector whose effect on a color and a direction of rotation of the circular polarization is restricted and which otherwise does not affect the transmitted light. By means of a novel element of this type, the functions of a color filter, a polarizer and a lens can be combined in a single element.

For the purposes of the invention, light is taken to mean electromagnetic radiation having wavelengths of between 300 and 3000 nm, preferably between 350 and 2000 nm.

Figures 1, 1A, 1B:
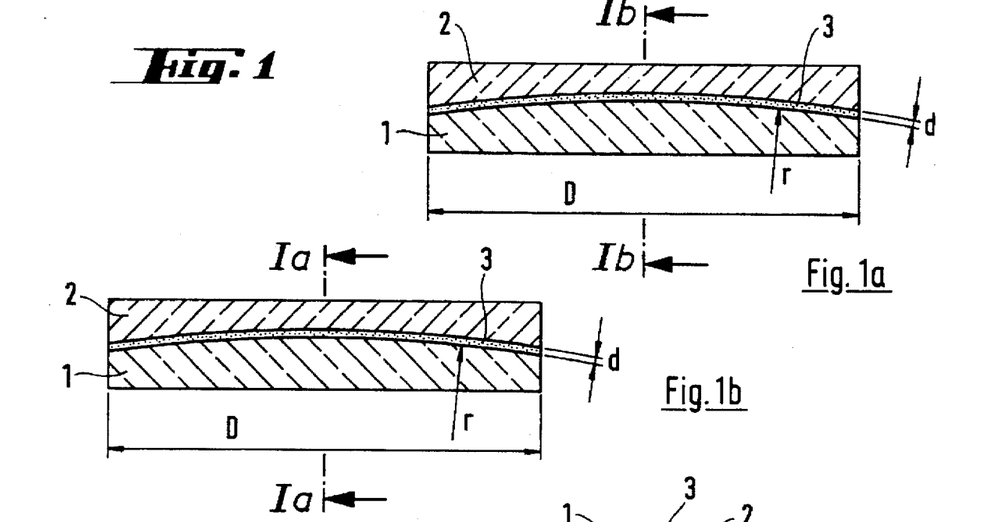
FIG. 1 shows the construction and use of a novel optical element comprising a spherical planoconvex lens (1), a spherical planoconcave lens (2) and a CLC layer (3) between the two lenses. In the figure, r represents the radius of curvature of the planoconvex lens, D represents the diameter of the optical element, d represents the thickness of the CLC layer (which corresponds to the separation between the lenses (1) and (2)), a represents the thickness of the convex lens in the center, f and F represent the focal length and focal point of the novel optical element when used as a concave mirror, a' represents the thickness of the concave lens in the center, f' and F' represent the focal length and imaginary focal point of the novel optical element when used as a convex mirror.
FIG. 1a) shows a longitudinal section through the element. The section plane represented in FIG. 1b) is shown.
FIG. 1b) shows a longitudinal section perpendicular to FIG. 1a) through the element. The section plane represented in FIG. 1a) is shown.

For example, an optical element comprising a CLC layer between a planoconvex lens and a planoconcave lens, depending on which side is irradiated, acts as a concave mirror on one side and as a convex mirror on the other side. In the former case, parallel-incident light is reflected by the CLC layer and collected at the focal point; in the latter case, the light becomes divergent and appears to emanate from the imaginary focal point behind the element, as shown in FIG. 1.

The ray path of the non-reflected light is not affected by the novel elements. The focal length of the elements can be adjusted through a suitable choice of the focal length of the lenses used.

In addition to said planoconvex and planoconcave lenses, lenses with a cylindrical geometry which have no curvature in one direction, but are curved in a parabolic, circular or elliptical manner perpendicular to this direction, are further examples of light-transmitting substrates having a curved surface.

A reflector which forms images in an ideal manner should have a parabolically curved surface. However, lenses having a spherically or elliptically curved surface can also be used to produce the novel elements.

The use of lenses having curved surfaces on both sides, convex-concave, convex-convex or concave-concave lenses, can be used to produce elements which image not only the reflected portion of the light, but also the transmitted portion of the light.

Elements comprising a CLC between a planoconvex and a planoconcave spherical lens are suitable for use in projection displays. The high light fluxes in such equipment require the use of substances which are insensitive to and do not absorb light, for example CLCs. Hitherto, the poor polarizing action of CLC layers on irradiation at large angles stood in the way of use of CLCs in such equipment. When the novel elements are used, this problem is solved, since large angles do not occur. In addition, the use of the novel elements reduces the number of components in the projection display and increases the light efficiency of the display.

Figure 2A:
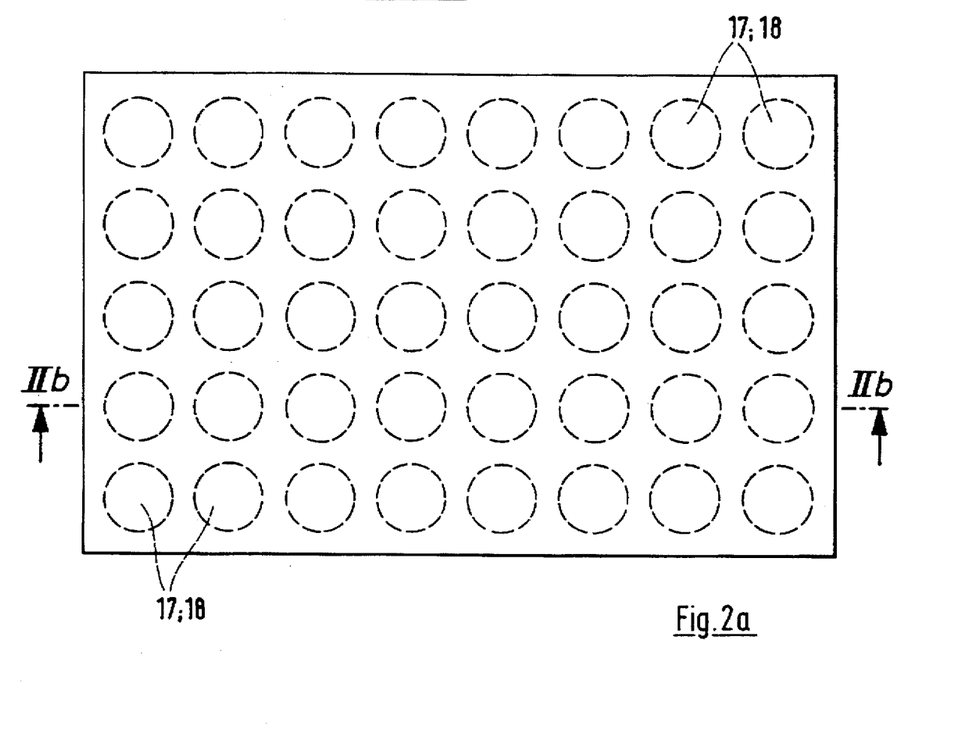
FIG. 2a) shows a plane view of the combination of 5×8 novel concave mirrors on a substrate. The section represented in FIG. 2b) is shown.
Figure 2B:
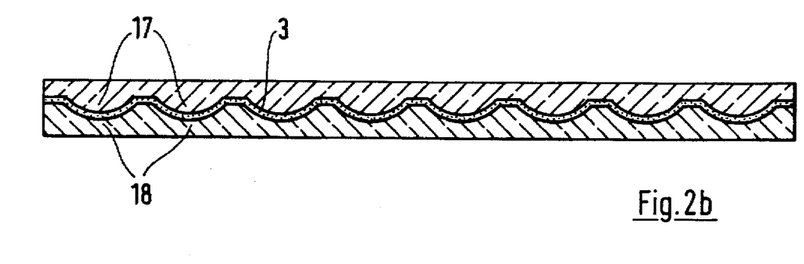
FIG. 2b) shows a diagrammatic and greatly magnified view of a cross section through the plan view represented in FIG. 2a). A CLC layer (3) of constant thickness is located between the transparent substrate surface containing a field of 5×8 convex lenses (17) and the transparent substrate surface containing 5×8 concave lenses (18).

A plurality of novel optical elements can be combined on a substrate. Such a combination, comprising a field of 5×8 novel concave mirrors, is shown in FIG. 2.

The novel reflectors can be produced by applying at least one cholesteric liquid crystal to the curved surface of a light-transmitting substrate, after application of an alignment layer, and subsequently distributing this cholesteric liquid crystal, by applying a second curved surface of a light-transmitting substrate, to which an alignment layer has likewise been applied, in such a way that a thin CLC film of constant thickness is formed between the curved surfaces of the two light-transmitting substrates. Before application to the substrate surface, the cholesteric liquid crystal is cleared or warmed close to the clearing point, preferably within 20° C., in order to render it flowable. To this end, the curved surfaces of the light-transmitting substrate are also preferably warmed to approximately the same temperature.

A further process for the production of novel optical elements comprises introducing at least one CLC into the cavity of constant thickness between two curved surfaces and aligning the liquid-crystalline substance in a manner known in such a way that the helix axis is perpendicular to the substrate surface.

Suitable substrates for the production of the curved surfaces are all materials which are transparent to light; preference is given to glasses, quartz and/or highly transparent plastics. Optical glasses, for example BK7 (Schott Glaswerke, Mainz, Germany), are preferred.

The surfaces of the substrates are shaped in such a way that a gap of constant thickness is formed between the two surfaces. The thickness of the gap can be adjusted by changing the separation of the substrate surfaces from one another. The gap can be set to the desired thickness using spacers. The desired thickness is preferably between 0.5 and 150 μm, particularly preferably between 2 and 70 μm. The curved substrate surfaces thus form a curved cell of constant thickness.

A simple example of such an arrangement of the surfaces is the combination of a planoconvex, spherical lens of focal length $f_{convex}$ with a planoconcave lens of focal length $f_{concave}$, both lenses having an identical refractive index n, in such a way that the side with convex curvature is in contact with the side of concave curvature (See FIG. 1).

The following applies to the radii of curvature r:

$$r_{convex} + d = -r_{concave} \qquad (2),$$

where d is the thickness of the gap between the two surfaces. The lenses generally used have radii of curvature of greater than 5 mm, corresponding to minimum focal lengths of 10 mm. By comparison, the thickness of the gap, in general at most 150 μm, preferably at most 70 μm, is negligible. Thus, lenses having the same, but opposite curvature can generally be used. In these:

$$r_{convex} = -r_{concave} \qquad (3),$$

Since $$f = r/(n-1) \qquad (4),$$

$$f_{convex} = -f_{concave} \qquad (5),$$

Surfaces having complex geometries can be used for the production of the novel reflectors so long as the following condition for the curvature p(x,y) of substrate 1 and substrate 2 at point (x,y) is satisfied:

$$p_1(x,y) = -p_2(x,y) \qquad (6),$$

The curvature p(x,y) here is regarded as a modulation of the substrate surface (x,y), where the separation between the substrates is neglected as mentioned above.

For lenses having very small radii of curvature, for example those having radii of curvature less than 5 mm, the thickness of the CLC layer must be taken into account as in equation (2).

The gap between the two substrate surfaces can be filled using any CLC having a pitch which results in reflection at a light wavelength in the range from 300 to 3000 nm.

The nature and proportion of the chiral substance of the CLC determine the pitch of the twisted structure of the CLC and thus the wavelength of the reflected light. The twisting of the structure can be either left-handed or right-handed. In addition, the CLCs can contain polymerizable groups which enable later fixing of the aligned structure. Examples of such groups are methacryloxy and acryloxy groups.

Suitable materials and their preparation are described in DE-C2-3,604,757, EP-A2-358 208, EP-A-0 066 137 (corresponds to U.S. Pat. No. 4,388,453) or in the references cited by D. J. Broer et al., in 14th Int. Liquid Conf., Abstracts II, 921 (1992).

Preference is given to polyorganosiloxanes with a three-dimensionally crosslinked structure, as described in EP-A-358 208.

However, the gap between the two surfaces can in principle be filled by any CLC. It is possible to use a single type of CLC, it is also possible to use a mixture of at least two of the liquid crystals. Monomeric mixtures of cholesteric, liquid-crystalline substances can be prepared by combining a nematic liquid crystal with a chiral substance.

By using liquid-crystalline substances whose reflection wavelength is in the region of the reflection maximum desired in each case, reflectors can be produced for any desired wavelength. By selecting liquid-crystalline substances with a right-handed or left-handed helical structure, the circular polarization reflected by the novel reflector can be set as desired in each case.

The production of reflective layers requires a homogeneous alignment of the helix axis of the CLC perpendicular to the reflector surface.

In principle, this can be carried out using any known process for alignment of CLC layers. For example, the alignment can be carried out by shearing or applying an alignment layer.

A planar alignment of the preferred nematic, cholesteric materials can be produced by applying, for example, a thin film of polyimide or nylon or another suitable substance as alignment layer to the substrate surface. The application is carried out by methods known from the production of LC displays. The film is given its planar-aligning effect by rubbing with a velvet cloth.

A homeotropic alignment, as required when smectic materials are used, can be achieved by applying lecithin as the alignment layer.

When CLCs having a lateral dipole moment are used, alignment can also be achieved by applying an electric field, after the cell has been filled with the liquid-crystalline substance, in such a way that the field direction is aligned perpendicular to the substrate surface. Alignment by means of an electric field is made possible by providing the substrate surfaces with a conductive coating. This can be carried out by ITO vapor deposition on the substrate surfaces.

The CLC is introduced into the cell in a known manner, for example by capillary action.

The novel reflector reflects parallel light with circular polarization in the spectral region of the reflection band and focuses it at the focal point of the reflector. The non-reflected light continues its path unchanged. The transmitted light is thus available for further use. For example, the focused reflected light can first be diverted by a small planar mirror so as to be available for any desired use outside the original ray path.

Figure 3:
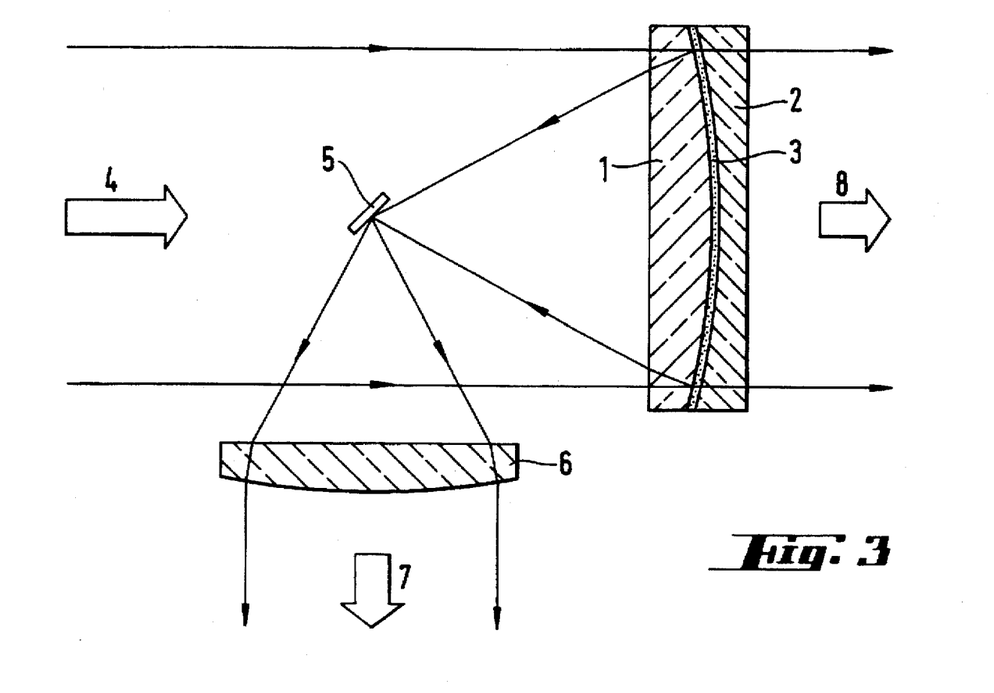
FIG. 3 shows a novel beam splitter element for separating color with defined polarization from incident, unpolarized, white light. In this figure, (1) represents a planoconvex lens, (2) represents a planoconcave lens, (3) represents a CLC layer, (4) represents parallel-incident, white, unpolarized light, (5) represents a planar mirror, (6) represents a collector lens, (7) represents circular-polarized light in the spectral region of the cholesteric reflection band, (8) represents transmitted light without the component reflected by the CLC layer.

The novel use of a spherical CLC element as beam splitter element is shown in FIG. 3. The reflector comprising a spherical, planoconvex lens (1), a spherical, planoconcave lens (2) and a CLC layer (3) is hit by parallel, unpolarized, white light (4). The reflected portion of the light is focused on a mirror (5) and bundled by the collector lens (6). This part-beam (7) has circular polarization and is restricted spectrally to the reflection band of the CLC layer. The transmitted light (8) lacks this component, so that it has the opposite circular polarization within the reflection band and is unpolarized for wavelengths outside the reflection band.

Figure 4:
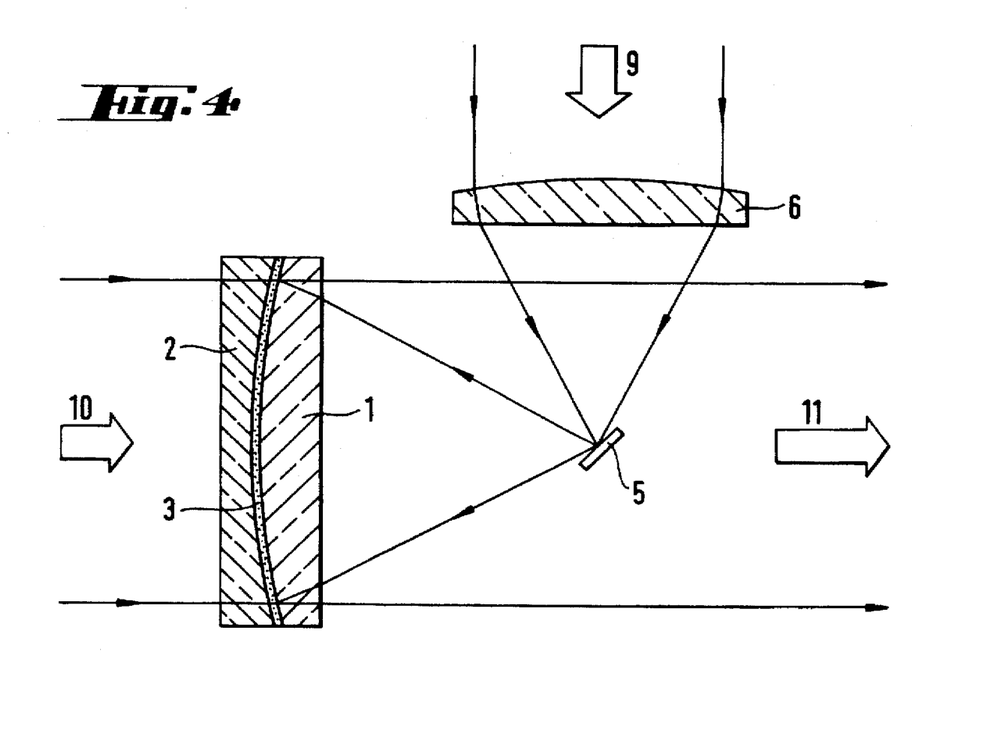

The novel use of a spherical CLC element for the recombination of image-forming ray paths of different colors is shown in FIG. 4. Incident, parallel light (9) is focused by a collector lens (6) on a mirror (5), from there it falls on the novel element comprising a spherical, planoconvex lens (1), a spherical, planoconcave lens (2) and the CLC layer (3), and is reflected by this element and is introduced into the transmitted beam (10) when circular polarization and color correspond to the circular polarization and color reflected by the CLC layer (3), giving the recombined light (11). The transmitted beam (10) is not affected if it only contains color components outside the reflection band of the CLC layer (3).

The novel beam splitters and recombiners thus enable both the splitting-up of the spectral regions and the polarization of the particular spectral region, while conventional beam splitters and polarizers split up or combine the spectral regions using dichroic mirrors which deflect the light incident at 45° through 90° and achieve the requisite polarization by means of separate foils separately from the splitting-up of the spectral regions.

It is not possible to replace the dichroic mirrors in conventional beam splitters by a known planar CLC layer in order to render the polarizer superfluous by utilizing the circular-polarized reflection since the polarizing effect of the known cholesteric layer in the case of reflection at an angle of 45° is inadequate (see, for example Schadt et al., Japanese Journal of Applied Physics, 29, No. 10, 1990, 1974–1984).

If a novel spherical reflector is used, only small reflection angles, preferably of less than 20°, more preferably of less than 15°, occur at usual apertures, so that good polarization of the cholesteric reflection is retained in the case of perpendicular incidence.

Figure 5:
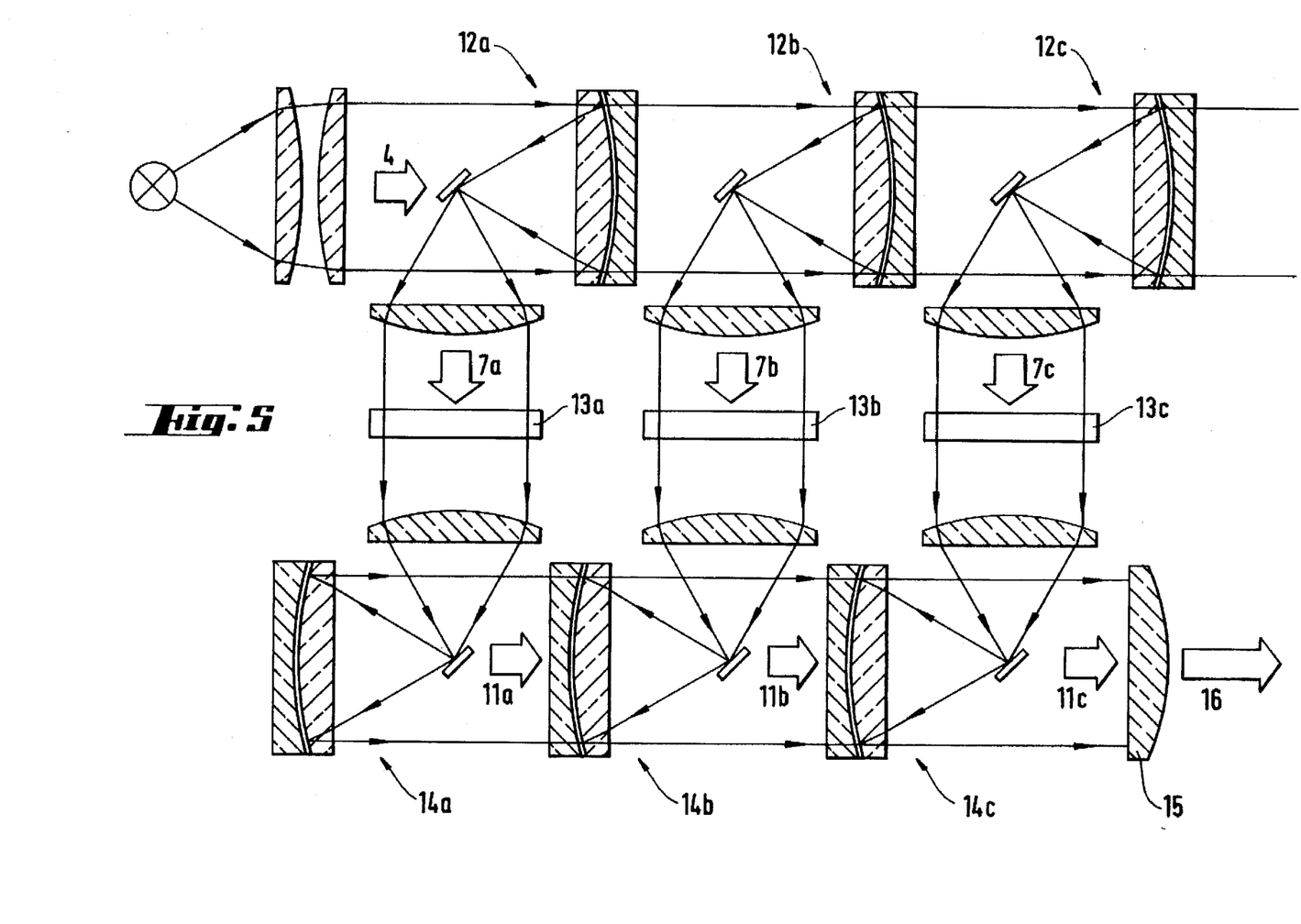
FIG. 5 shows the combination of a plurality of beam splitter elements for the separation and recombination of the elementary colors red, green and blue in a projection display. In this figure, (4) represents parallel-incident, white, unpolarized light, (7) represents circular-polarized light from the spectral region of the cholesteric reflection band, (11) represents recombined light, (12a–c) represent beam splitters corresponding to FIG. 3 for (12a) red light, (12b) green light and (12c) blue light, (13a–c) represent a liquid-crystal display for the production of the (13a) red part image, (13b) the green part image (13c) the blue part image, (14a–c) represent a recombiner corresponding to FIG. 4 for (14a) red light, (14b) green light and (14c) blue light, (15) represents an image-forming optical system, and (16) represents projection of the image to the viewing screen.

For example, as shown in FIG. 5, through the combination of 3 novel beam splitters (12a–12c), each with a different CLC layer, the primary colors red, green and blue can be selected with defined circular polarization (7a–7c), the circular polarization can be modulated locally, i.e., the circular polarization is inverted or retained depending on the switching state of the pixel, in each case by one liquid-crystal display (13a–13c), as already used in the prior art, and the 3 ray paths can be recombined by a second combination of three novel reflectors (14a–14c), each with a different CLC layer. The recombined part beams (11a–11c) are projected onto a viewing screen (16) by an image-forming optical system (15). Such a combination of elements which reflect the primary colors red, green and blue allows the construction of a projection display in which polarization, color separation and color recombination are achieved by cholesteric layers.

DISCUSSION OF THE DRAWINGS

FIG. 4 shows a novel beam splitter element for the recombination of image-forming ray paths with different colors. In this figure, (1) represents a planoconvex lens, (2) represents a planoconcave lens, (3) represents a CLC layer, (5) represents a planar mirror, (6) represents a collector lens, (9) represents circular-polarized light from the spectral region of the cholesteric reflection band, (10) represents light from outside the cholesteric reflection band, and (11) represents recombined light.

The examples below serve to illustrate the invention in greater detail.

The following substances were used in the novel process:

SUBSTANCE I

The substance Wacker-LC-Silicon-CC3767 (commercially available from Wacker-Chemie GmbH; Munich) is a nematic, cholesteric, liquid-crystalline organosiloxane. At 70° C., the reflection maximum of this CLC is at 670 nm. The reflected light has left-handed helical polarization.

SUBSTANCE II

The substance Wacker-LC-Silicon-CC3939 (commercially available from Wacker-Chemie GmbH; Munich) is a nematic, cholesteric, liquid-crystalline organosiloxane. At 70° C., the reflection maximum of this CLC is at 390 nm. The reflected light has left-handed helical polarization.

SUBSTANCE III

The substance Wacker-LC-Silicon-CC37150 (commercially available from Wacker-Chemie GmbH; Munich) is a nematic, cholesteric, liquid-crystalline organosiloxane. At 70° C., the reflection maximum of this CLC is at 1500 nm. The reflected light has left-handed helical polarization.

SUBSTANCE IV a, b and c

By mixing substances I–III, any reflection wavelength between 390 nm and 1500 nm can be set. Three mixtures were prepared for the primary colors red, green and blue, with reflection wavelengths at 634 nm (a: 95% of substance I and 5% of substance II), 530 nm (b: 70% of substance I and 30% of substance II) and 453 nm (c: 40% of substance I and 60% of substance II) when they were polymerized at 70° C.

SUBSTANCE V

A nematic, cholesteric, liquid-crystalline organosiloxane was synthesized as follows:

a. Preparation of doristeryl 4-(propen-2-oxy)benzoate 50 g of cholestadiene (98%, Aldrich GmbH, Steinheim) are dissolved in 800 ml of dry ethyl acetate to which 30 ml of acetic acid have been added, 1.5 g of platinum oxide are added, and the mixture is transferred into an autoclave with a capacity of 2 l. The hydrogenation is carried out at 50° C. and a hydrogen pressure of 10 atm and is generally complete after 24 hours. When the reaction is complete, the catalyst is filtered off, the solvent is removed on a rotary evaporator, and the doristerol obtained is recrystallized from ethanol. Yield: 42.5 g (88.5%). The purity of the substance is ensured with the aid of $^1$H-NMR and $^{13}$C-NMR spectroscopy.

17 g of 4-(propen-2-oxy)benzoyl chloride (prepared by known processes starting from methyl 4-hydroxybenzoate by allylation, hydrolysis and conversion into the acid chloride) and 32 g of doristerol are dissolved in 200 ml of dry toluene, and the mixture is refluxed for 15 hours. The solvent is subsequently removed by distillation, and the residue is recrystallized from ethanol; yield: 44.9 g; (99% yield), melting point 92° C. (n* 105° Ci).

b. Hydrosilylation 1 g of doristeryl 4-(propen-2-oxy)benzoate, 1.53 g of 4'-phenylphenyl 4-(propen-2-oxy)benzoate (prepared by conventional preparation processes) and 646 mg of pentamethylcyclopentasiloxane are dissolved in 20 ml of dry toluene, 0.1 ml of a solution of dicyclopentadienylplatinum dichloride (1% strength by weight in methylene chloride) is added, and the mixture is warmed at 100° C. for 1 hour. The solution is cooled to 50° C., and 1.45 g of (4-methacryloxy) phenyl 4-(propen-2-oxy)benzoate (prepared by conventional preparation processes), 500 ppm of hydroquinone and a further 0.1 ml of the catalyst solution are added; this solution is stirred at 70°–80° C. for half an hour. When the reaction is complete, the catalyst is separated off via a short, silica gel-filled column (1=3 cm, diameter=3 cm), and the product is precipitated in ethanol, giving 2.8 g (60%) of a substance having a reflection wavelength of 456 nm at 60° C. The reflected light has right-handed helical polarization.

SUBSTANCE VI

The nematic mixture Merck ZLI-1565 (E. Merck, Darmstadt) is converted into a nematic, cholesteric liquid crystal which reflects left-handed helical light at 770 nm by addition of 20% by weight of the chiral substance Merck ZLI-811.

EXAMPLE 1

Figures 6, 6A, 6B, 6C:
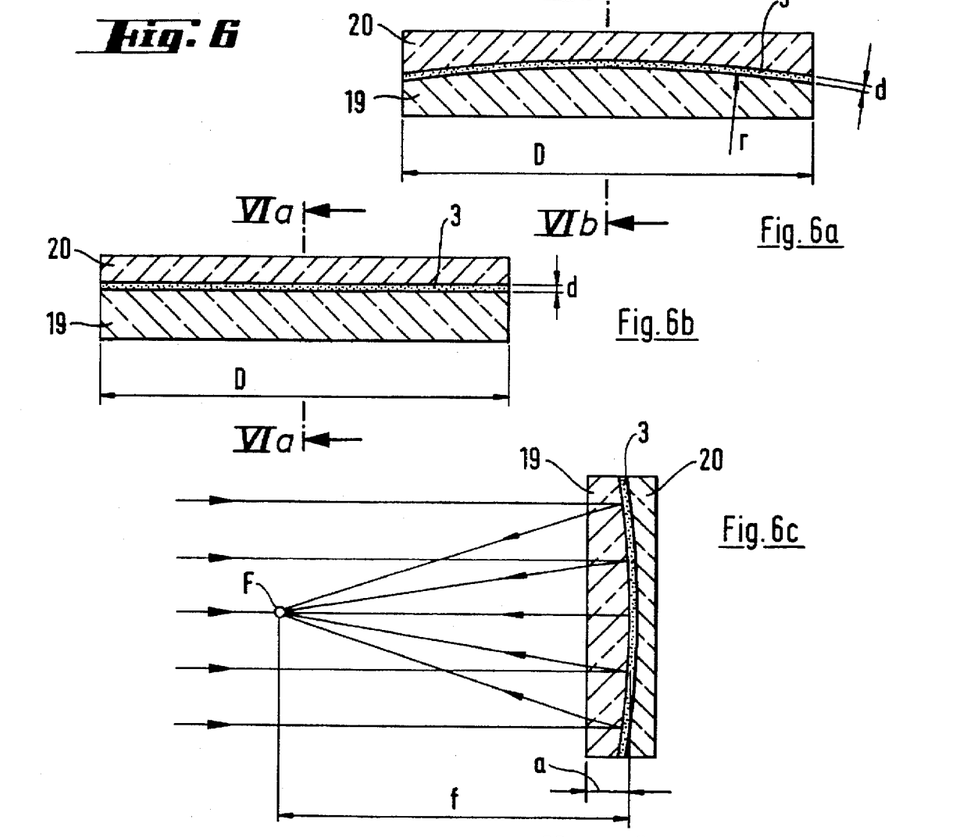
FIG. 6 shows the construction and use of a novel optical element consisting of a cylindrical planoconvex lens (19), a cylindrical planoconcave lens (20) and a CLC layer (3) between the two lenses. In the figure, r represents the radius of curvature of the planoconvex lens, D represents the diameter of the optical element, d represents the thickness of the CLC layer, which corresponds to the separation between the lenses, a represents the thickness of the convex lens in the center, f and F represent the focal length and focal point of the novel optical element when used as a concave mirror, a' represents the thickness of the concave lens in the center, f' and F' represent the focal length and imaginary focal point of the novel optical element when used as a convex mirror.
FIG. 6a) shows a longitudinal section through the element. The section plane represented in FIG. 6b) is shown.
FIG. 6b) shows a longitudinal section perpendicular to FIG. 6a) through the element. The section plane represented in FIG. 6a) is shown.
FIG. 6c) shows the ray path of the light when the novel optical element is used as a concave mirror.

Cylindrical reflector (FIGS. 6a+b shows sections through the element):

A reflective CLC layer (3) was produced between a planoconvex (19) and a planoconcave (20) cylindrical lens made of glass (BK7 where $n_{BK7}=1.5187$) having the focal lengths 300 mm and −300 mm. The substance IVb having a reflection wavelength of 530 nm was used here, and, for the later photopolymerization, was mixed with 2% of the photoinitiator (Irgacure 907; Ciba Geigy). In detail, the curved surfaces of the cylindrical lenses were first provided with a cured polyimide coating and subsequently rubbed unidirectionally with a velvet cloth for alignment. The curved surface of the concave lens held at 70° C. was treated with a sufficient amount of the CLCs likewise warmed to about 70° C., and the latter was subsequently distributed by placing the convex lens, likewise warmed to about 70° C., on top until a thin film (layer thickness about 10 μm) remained between the surfaces. The film was subsequently polymerized by irradiation with UVA light.

Figure 6D:
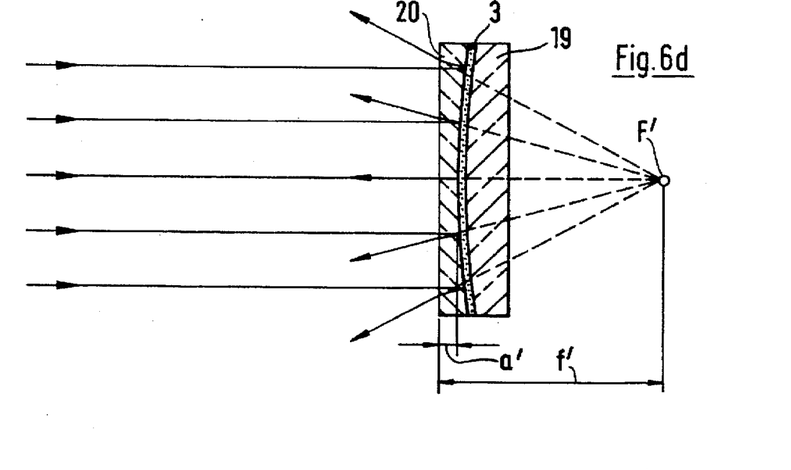
FIG. 6d) shows the ray path of the light when the novel element is used as a convex mirror.

The image-forming properties of this element for light from the reflection band with left-handed helical polarization are those of a cylindrical concave mirror having a radius of curvature of ±155.6 mm. In a free concave mirror, the focal length for rays close to the axis is r/2 on the concave side and −r/2 on the convex side (FIGS. 6c+d). The glass coating of the lens substrate introduces an additional refracting interface into the ray path, so that the focal length is calculated from the equation $$f=a+(r/2-a)/n \qquad (7)$$

as being f=52.6 mm for the concave mirror (a=4 mm) and f'=−48.7 mm for the convex mirror (a'=−7.5 mm; see also Table 1).

Parameters of the optical elements described in Table 1, examples 1 to 9 (length data in [mm]; the abbreviations correspond to those used in the drawings; focal lengths f and f' calculated from equation 7; $f_{convex}$: focal length of the convex lens; same for $f_{concave}$).

TABLE 1

| Example | $f_{convex}$ | D | a | a' | r | f | f' |
|---|---|---|---|---|---|---|---|
| 1 | 300 | 60 | 4 | −7.5 | 155.6 | 52.6 | −48.7 |
| 2, 3, 4, 5, 6, 7 | 200 | 50 | 6 | −2 | 103.7 | 36.2 | −33.5 |
| 8 | 600 | 95 | 6.6 | −3 | 311.2 | 104.7 | −101.4 |
| 9 | 150 | 22.4 | 2.8 | −2 | 77.8 | 26.6 | −24.9 |
| 10 | 10 | 5 | 2.6 | −2 | 5.2 | 2.6 | −1 |

EXAMPLE 2

Figure 1C:
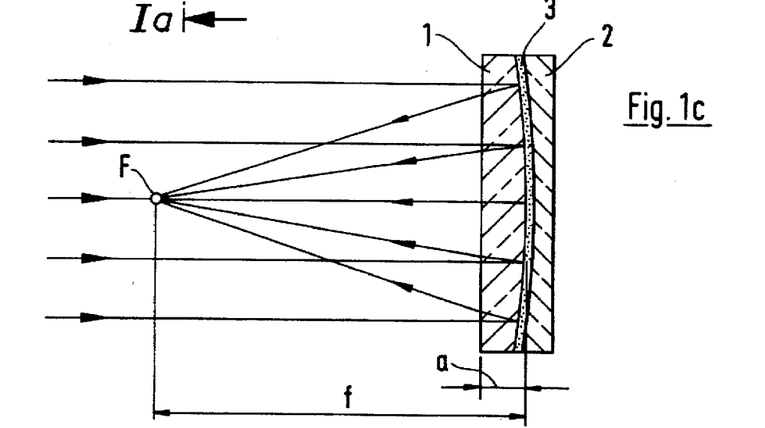
FIG. 1c) shows the ray path of the light when the novel element is used as a concave mirror.
Figure 1D:
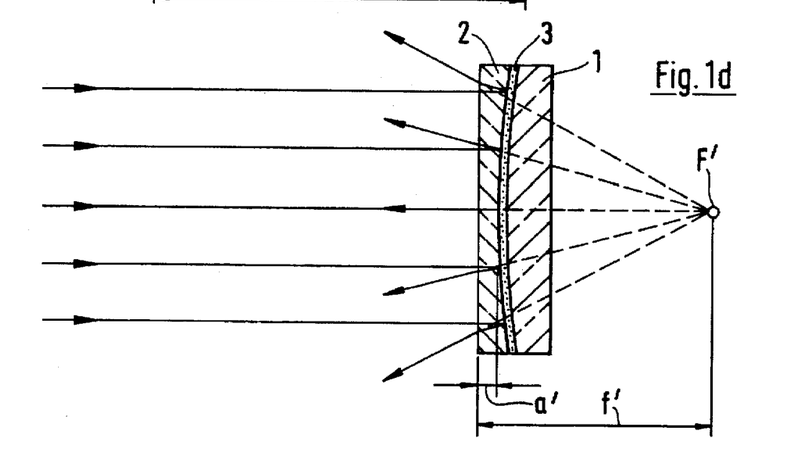
FIG. 1d) shows the ray path of the light when the novel element is used as a convex mirror.

Spherical reflector, concave mirror (FIGS. 1a and b show sections through the rotationally symmetrical element): a red-reflecting, polymerized CLC layer (3) is produced from substance IVa analogously to the steps described in Example 1 between a planoconvex (1) and a planoconcave (2) spherical lens having the focal lengths 200 mm and −200 mm. The imaging properties for light from the reflection band with left-handed helical polarization are those of a spherical concave mirror (cf. FIGS. 1c and d). The dimensions and focal lengths of the element are shown in Table 1.

EXAMPLE 3

A spherical concave mirror was produced analogously to Example 2 using the green-reflecting CLC of substance IVb.

EXAMPLE 4

A spherical concave mirror was produced analogously to Example 2 using the blue-reflecting CLC of substance IVc.

EXAMPLE 5

A spherical concave mirror was produced analogously to Example 2 using the CLC of substance III, which reflects at 1500 nm.

EXAMPLE 6

A spherical concave mirror was produced analogously to Example 2 using substance V. Substance V is not polymerizable. The element was therefore fixed by cooling to below the glass transition temperature of substance V, which is at about 30° C.

EXAMPLE 7

A spherical concave mirror was produced analogously to Example 2 using substance VI. However, the fixing of the element was not carried out here by polymerization of the liquid crystal, but instead by bonding the lens edges using a commercial, solvent-free adhesive (UHU plus instant).

EXAMPLE 8

A spherical concave mirror was produced analogously to Example 2 using lenses having the focal lengths 600 mm and −600 mm (see Table 1).

EXAMPLE 9

A spherical concave mirror was produced analogously to Example 2 using lenses having the focal lengths 150 mm and −150 mm (See Table 1).

EXAMPLE 10

A spherical concave mirror was produced analogously to Example 2 using lenses having the focal lengths 10 mm and −10 mm (see Table 1).

EXAMPLE 11

A polarizing beam splitter was constructed from the element described in Example 3 (see FIG. 3).

To this end, the coil of an incandescent light bulb (12 V, 150 W) was imaged on infinity by means of a condenser. The light (4), which was thus parallel, fell on the spherical reflector (3). A circular polarization of the incident white light was focused on the mirror (5) in accordance with the reflection band of the CLC layer, which was in the green spectral region. The degree of polarization for various apertures on the spherical reflector was measured for the exiting beam (7) by the method described in M. Born, E. Wolf; "Principles of Optics" (Pergamon Press, 6th edn; p. 552). The aperture is given by the ratio between the diameter of the illuminated area and the separation between the CLC layer (3) and the focus in the mirror (5), the focal length of the mirror (according to Table 1). The illuminated area was adjustable by means of a diaphragm. Up to the maximum aperture of 0.28, the same degree of polarization of 0.970±0.002, which is very close to the ideal value of 1, was obtained in each case. The observation band width here was restricted to 20 nm.

By comparison, a significantly worse degree of polarization of 0.90 was measured for a 90° deflection by means of a planar CLC layer (angle of incidence 45°).

What is claimed is:

1. A wavelength- and polarization-selective element which forms an optical image, wherein at least one cholesteric liquid crystal is enclosed in the cavity of constant thickness between two light-transmitting substrates having curved surfaces in such a way that the helix axis of the liquid crystal is aligned perpendicular to the curved surface of the light-transmitting substrates;

wherein the cholesteric liquid crystal employed comprises at least one polyorganosiloxane.

2. A wavelength- and polarization-selective element which forms an optical image, wherein at least one cholesteric liquid crystal is enclosed in a cavity of constant thickness between two light-transmitting substrates having curved surfaces in such a way that the helix axis of the liquid crystal is aligned perpendicular to the curved surface of the light-transmitting substrates, wherein the light-transmitting substrate having curved surfaces is the concave side of a first cylindrical lens combined with the convex side of a second cylindrical lens in such a way that the element is in the form of a cylinder segment.

3. A wavelength- and polarization-selective element which forms an optical image, wherein at least one cholesteric liquid crystal is enclosed in the cavity of constant thickness between two light-transmitting substrates having curved surfaces in such a way that the helix axis of the liquid crystal is aligned perpendicular to the curved surface of the light-transmitting substrates;

wherein the light-transmitting substrate curved surfaces are the concave side of a first lens combined with the convex side of a second lens in such a way that said cholesteric liquid crystal forms a reflector in the form of a concave mirror.

4. A process for the production of optical elements, comprising

(a) applying at least one cholesteric liquid crystal to the curved surface of a light-transmitting substrate optionally having an alignment layer; wherein the liquid crystal and substrate are optionally warmed; and     (b) subsequently distributing the cholesteric liquid by applying the curved surface of a second optionally warmed light-transmitting substrate, optionally having an alignment layer;

in such a manner so as to form a thin cholesteric liquid crystal film having a constant thickness between the light-transmitting substrates.

5. A wavelength- and polarization-selective element which forms by reflection an optical image, wherein at least one cholesteric liquid crystal is enclosed in a cavity of constant thickness between a first light-transmitting substrate and a second light-transmitting substrate, said first and second light-transmitting substrates each having at least one curved cavity defining surface, in such a way that the helix axis of said liquid crystal is aligned perpendicular to said cavity defining surfaces, at least one of said first and second light-transmitting substrates being of non-uniform thickness;

wherein said first and second light-transmitting substrates are lenses individually selected from the group consisting of planoconcave, planoconvex, concaveconvex, concaveconcave, and convexconvex.

6. An optical system useful as a beam splitter comprising a wavelength- and polarization-selective element which forms an optical image, wherein at least one cholesteric liquid crystal is enclosed in the cavity of constant thickness between two light-transmitting substrates having curved surfaces in such a way that the helix axis of the liquid crystal is aligned perpendicular to the curved surface of the light-transmitting substrates;

wherein the cholesteric liquid crystal employed comprises at least one polyorganosiloxane and a mirror positioned within a portion of a path of incident light impinging upon said element such that light reflected from said liquid crystal contained in said cavity of said element impinges upon said mirror and is reflected away from the path of incident light impinging upon said element.

7. A color projection display device capable of producing a multicolored optical image from a stream of parallel white light having a direction of incidence, said device comprising:

a first beam splitter comprising a first wavelength- and polarization-selective element which forms an optical image, wherein at least one cholesteric liquid crystal is enclosed in the cavity of constant thickness between two light-transmitting substrates having curved surfaces in such a way that the helix axis of the liquid crystal is aligned perpendicular to the curved surface of the light-transmitting substrates, and a mirror positioned within a portion of said stream of incident light impinging upon said first wavelength and polarization selective element such that light reflected from a liquid crystal reflective surface contained in said cavity of said first wavelength and polarization selective element impinges upon said mirror and is reflected away from the path of incident light impinging upon said wavelength and polarization selective element such that light of a first color and circular polarization is reflected to form a first color reflected stream of polarized light, light of color and polarization other than said color and polarization being transmitted through said first beam splitter as a first color-polarization-removed stream of light;

at least a second beam splitter comprising a second wavelength- and polarization-selective element which forms an optical image, wherein at least one cholesteric liquid crystal is enclosed in the cavity of constant thickness between two light-transmitting substrates having curved surfaces in such a way that the helix axis of the liquid crystal is aligned perpendicular to the curved surface of the light-transmitting substrates, and a mirror positioned within a portion of the path of said first color-polarization-removed stream of light impinging upon said second wavelength and polarization selective element such that light reflected from a liquid crystal reflective surface contained in said cavity of said second wavelength and polarization selective element impinges upon said mirror and is reflected away from the path of incident light impinging upon said second wavelength and polarization selective element to form a second color reflected stream of polarized light;

a first color image positioned across said first color reflected stream of polarized light such that said first color reflected stream passes through said first color image to form a first color image stream of light;

a second color image positioned across said second color reflected stream of polarized light such that said second color reflected stream passes through said second color image to form a second color image stream of light;

a first recombiner comprising a third wavelength- and polarization-selective element which forms an optical image, wherein at least one cholesteric liquid crystal is enclosed in the cavity of constant thickness between two light-transmitting substrates having curved surfaces in such a way that the helix axis of the liquid crystal is aligned perpendicular to the curved surface of the light-transmitting substrates, having a mirror positioned in the path of said first color image stream on the side of said third wavelength and polarization selective element having a concave reflective surface defined by said liquid crystal contained in said cavity between said curved surfaces of said substrates such that said first color image stream impinging upon said mirror is directed to said concave reflective surface and is reflected thereby past said mirror to form a first color recombinable image-defining stream;

a second recombiner comprising a fourth wavelength- and polarization-selective element which forms an optical image, wherein at least one cholesteric liquid crystal is enclosed in the cavity of constant thickness between two light-transmitting substrates having curved surfaces in such a way that the helix axis of the liquid crystal is aligned perpendicular to the curved surface of the light-transmitting substrates, having a mirror positioned in the path of said second color image stream on the side of said fourth wavelength and polarization selective element having a concave reflective surface defined by said liquid crystal contained in said cavity between said curved surfaces of said substrates such that said second color image stream impinging upon said mirror is directed to said concave reflective surface of said second recombiner and is reflected thereby to form a second color recombinable image-defining stream such that said first color recombinable image-defining color stream is transmitted through said second recombiner and merges with said first color recombinable image-defining stream to form a recombined multicolored image stream.

* * * * *